US010970874B2

(12) United States Patent
Bang

(10) Patent No.: US 10,970,874 B2
(45) Date of Patent: Apr. 6, 2021

(54) METHOD AND APPARATUS FOR PERFORMING IMAGE FEATURE MATCHING USING LABELED KEYFRAMES IN SLAM-BASED CAMERA TRACKING

(71) Applicant: Electronics and Telecommunications Research Institute, Daejeon (KR)

(72) Inventor: Jun Seong Bang, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 109 days.

(21) Appl. No.: 16/370,550

(22) Filed: Mar. 29, 2019

(65) Prior Publication Data

US 2019/0304133 A1 Oct. 3, 2019

(30) Foreign Application Priority Data

Mar. 30, 2018 (KR) .................. 10-2018-0037686

(51) Int. Cl.
*G06T 7/00* (2017.01)
*G06T 7/73* (2017.01)
*H04L 29/06* (2006.01)
*G06K 9/62* (2006.01)
*H04N 7/18* (2006.01)

(52) U.S. Cl.
CPC .............. *G06T 7/74* (2017.01); *G06K 9/6201* (2013.01); *H04L 67/42* (2013.01); *H04N 7/183* (2013.01); *G06T 2207/30244* (2013.01)

(58) Field of Classification Search
CPC ............ G06T 7/74; G06T 2207/30244; G06K 9/6201; H04L 67/42; H04N 7/183
See application file for complete search history.

(56) References Cited

U.S. PATENT DOCUMENTS

| 7,634,336 | B2 | 12/2009 | Chae et al. |
| 9,367,811 | B2* | 6/2016 | Ramachandran .. G06K 9/00993 |
| 2008/0215184 | A1 | 9/2008 | Choi et al. |
| 2016/0012588 | A1* | 1/2016 | Taguchi ............... H04N 13/257 348/46 |
| 2018/0268237 | A1* | 9/2018 | Stanimirovic ........... G06K 9/46 |
| 2019/0080467 | A1* | 3/2019 | Hirzer ...................... G06T 7/74 |

(Continued)

FOREIGN PATENT DOCUMENTS

| KR | 101422084 B1 | 8/2014 |
| KR | 1020160119105 A | 10/2016 |

(Continued)

OTHER PUBLICATIONS

Raul Mur-Artal et al., "ORB-SLAM: A Versatile and Accurate Monocular SLAM System", IEEE Transactions on Robotics, Oct. 2015, pp. 1147-1163, vol. 31, No. 5.

*Primary Examiner* — Khai M Nguyen
(74) *Attorney, Agent, or Firm* — William Park & Associates Ltd.

(57) ABSTRACT

The present invention relates to a method and an apparatus for performing image feature matching in a SLAM-based camera and, more particularly, to a method and an apparatus for improving the performance and speed of feature matching by generating labeled keyframes including GPS information, receiving limited promising keyframes on the basis of the labeled keyframes, and applying weighted grid to perform image feature matching.

20 Claims, 13 Drawing Sheets

(56) References Cited

U.S. PATENT DOCUMENTS

| | | | | |
|---|---|---|---|---|
| 2019/0200154 A1* | 6/2019 | Vishwanathan | ...... | G06K 9/6253 |
| 2020/0158517 A1* | 5/2020 | Tadi | .......................... | G06T 7/80 |
| 2020/0409376 A1* | 12/2020 | Ebrahimi Afrouzi | ....................... B25J 9/1676 | |
| 2020/0409387 A1* | 12/2020 | Tsurumi | ............... | G05D 1/0238 |

FOREIGN PATENT DOCUMENTS

| | | | | |
|---|---|---|---|---|
| KR | 1020170126300 A | | 11/2017 | |
| KR | 1020180009180 A | | 1/2018 | |
| WO | WO-2014020318 A1 * | 2/2014 | ......... | A63F 13/5378 |

\* cited by examiner

FIG. 3

| KFL-ID | Res | Des | World-N XY | Grid-ID$_1$ | Grid-V$_1$ | ... | Grid-ID$_N$ | Grid-V$_N$ | GPS | Rank | b00 | Utag-Byte | Utag-Len | UTag$_1$-t | UTag$_1$-t | ... | UTag$_N$-t | UTag$_N$-t | OTag$_1$-t | ... | OTag$_N$-t | KFL-TM |

FIG. 9
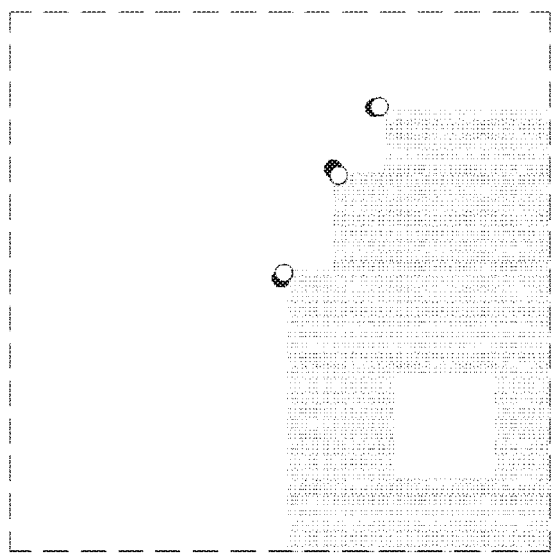
(a)
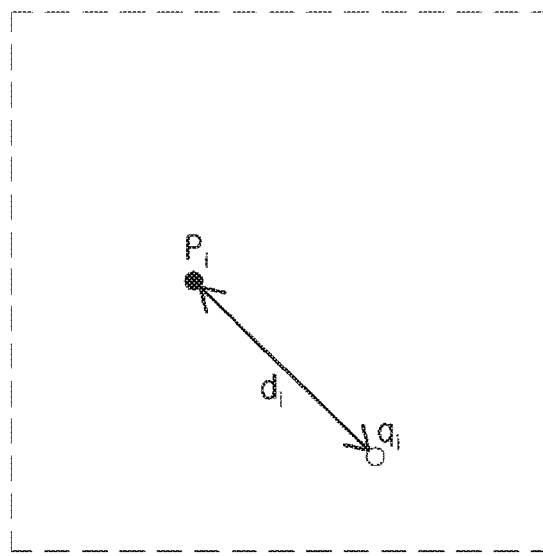
(b)

FIG. 10
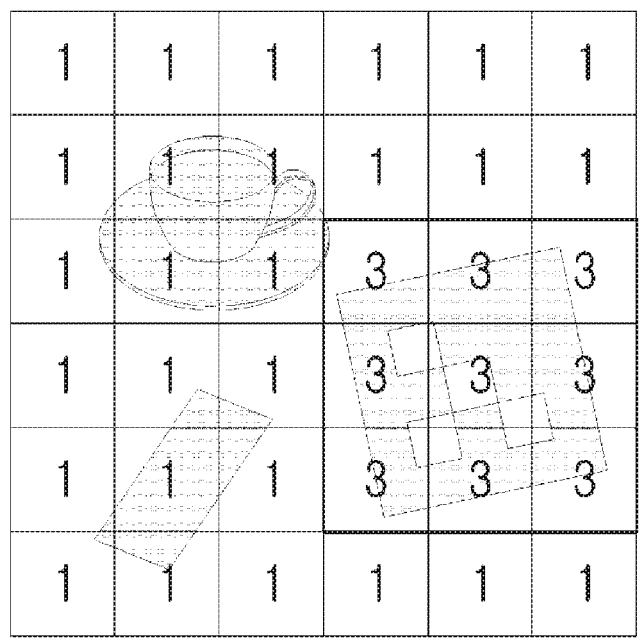
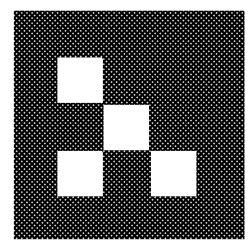
AR Marker

FIG. 12
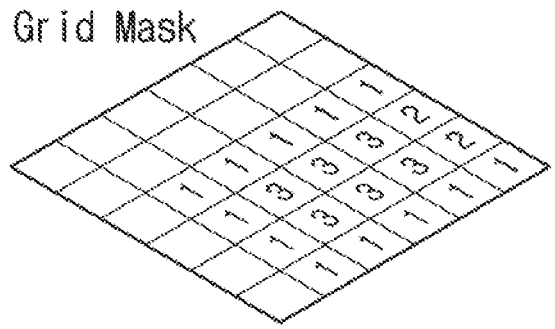
(a)
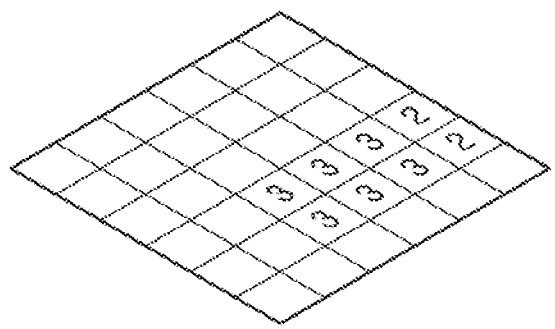
(b)
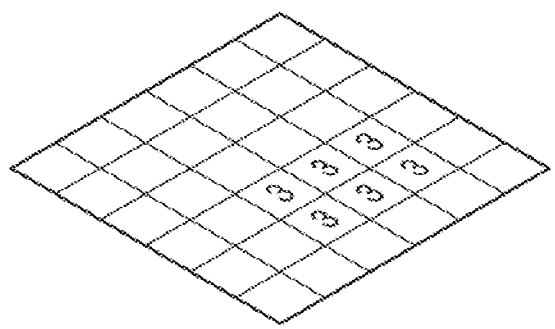
(c)

FIG. 13
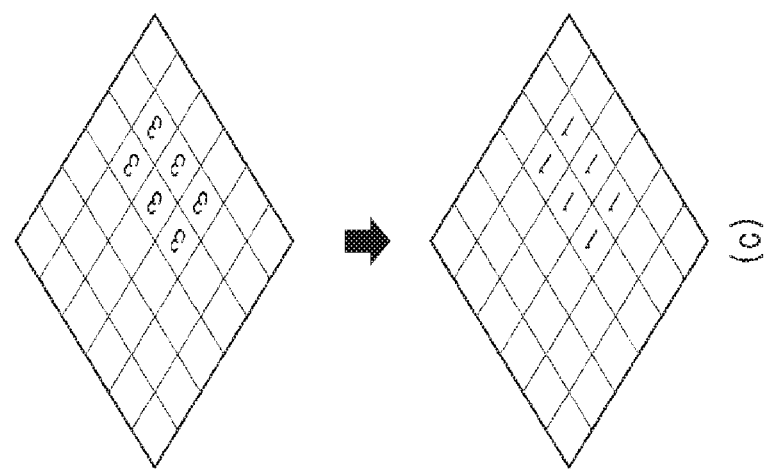
(c)
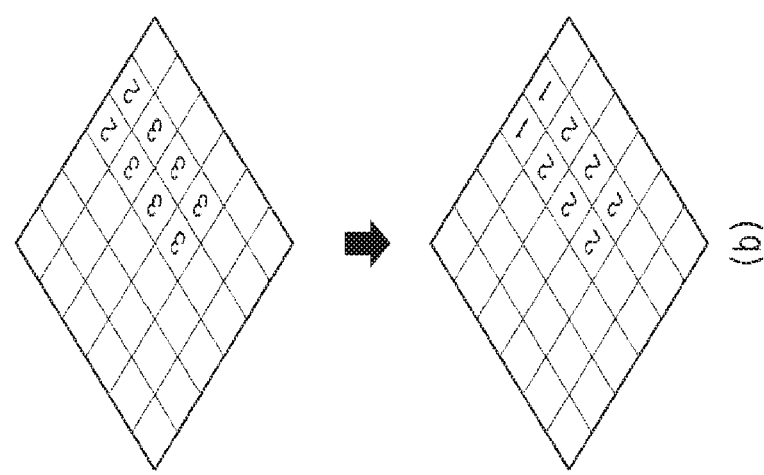
(b)
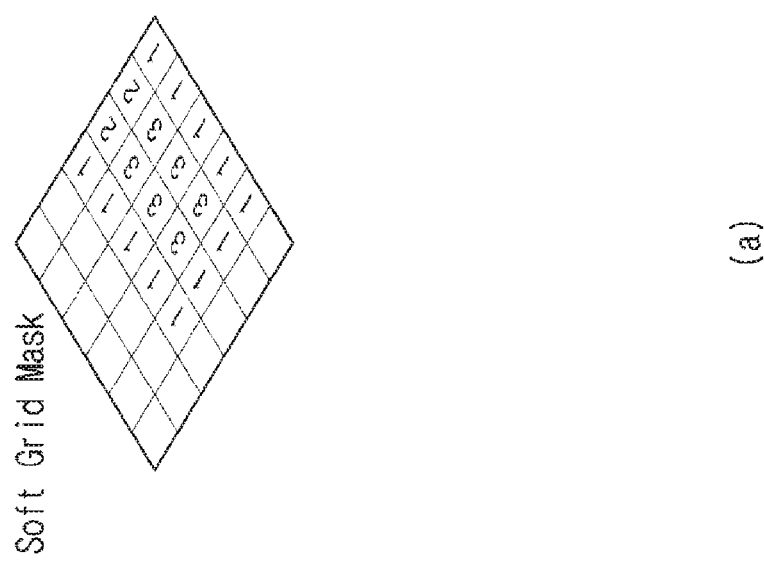
Soft Grid Mask
(a)

METHOD AND APPARATUS FOR PERFORMING IMAGE FEATURE MATCHING USING LABELED KEYFRAMES IN SLAM-BASED CAMERA TRACKING

CROSS REFERENCE TO RELATED APPLICATION

The present application claims priority to Korean Patent Application No. 10-2018-0037686, filed Mar. 30, 2018, the entire contents of which are incorporated herein for all purposes by this reference.

BACKGROUND OF THE INVENTION

Field of the Invention

The present invention relates generally to a method of performing image feature matching using labeled keyframes in SLAM-based camera tracking. More particularly, the present invention relates to a method of calculating a camera pose by comparing image feature matching between keyframes and camera image in the process of constructing a spatial map.

Description of the Related Art

Simultaneous localization and mapping (SLAM)-based camera tracking technology is to calculate a camera pose including camera position or direction information on the basis of an image input by camera. This is also referred to as visual SLAM (vSLAM).

According to a SLAM technology using camera image in the related art, a spatial map of 3D point cloud is constructed using an extended Kalman filter method, and the camera pose is calculated. However, since this method requires a large amount of computations, it has recently been proposed to calculate the camera pose through feature matching between the camera image and features (for example, keypoints, feature lines, etc.) using keyframes generated in the process of making the spatial map. The keypoints are selected by a feature descriptor such as oriented FAST and rotation BRIEF (ORB), and thus the keypoints in the image may be changed according to the feature descriptor.

In SLAM-based camera tracking, the spatial map is constructed as some of camera input images is stored as keyframes. After the spatial map with keyframes is constructed, keyframes to be compared in feature with a camera input image of a user terminal are selected from among keyframes, and a camera pose including the camera position and direction is calculated using a relationship between the keyframes and the image.

The SLAM-based camera tracking technology is necessary for the development of Augmented Reality (AR) applications. In order to properly place the 3D virtual object in the real space, it is necessary to track a camera viewpoint of a user terminal such as a smart phone or a viewpoint of a user wearing smart glasses in real time. The SLAM-based camera tracking should operate accurately and reliably, because camera viewpoint tracking technology directly affects immersion in AR contents.

As the technology for AR application development is in its early stage, the 3D point cloud map is constructed with keyframes for small specific areas at present. However, in the future, AR contents will be developed for large-scale spaces and other spaces in various regions. In the process of constructing the spatial map in large-scale or multiple spaces, when keyframes are stored in the user terminal or on one or more servers (or cloud servers), there may be a very large number of similar keyframes for which the computer has a difficulty in discriminating differences in images. Since there are many similar keyframes, the search time delay for keyframe selection may increase. Also, since improper keyframes are selected, the image feature matching error rate may increase. This leads to increase in likelihood of camera tracking failures, which directly affects stopping the AR application execution and reducing immersion in contents.

Therefore, it is required to develop a technique for allowing camera tracking to be easily operated, by reducing the search time necessary to calculate the camera pose applied to a large-scale or multiple spaces, and reducing image feature matching error due to selection of improper keyframes.

SUMMARY OF THE INVENTION

An object of the present invention is to provide a method capable of lowering feature matching error in SLAM-based camera tracking.

The present invention proposes a method capable of enhancing the accuracy and stability of image feature matching in feature matching between keyframes and camera image.

The present invention proposes a method capable of ensuring the execution speed of an application even under a temporary or intermittent computing load.

It will be appreciated that the technical objects to be achieved by the present disclosure are not limited to the above-mentioned technical objects, and other technical objects which are not mentioned are to be clearly understood from the following description to those skilled in the art.

According to an embodiment of the present invention, a method of performing image feature matching in a SLAM-based camera may be provided. The method includes generating labeled keyframes including GPS information and/or first information from an input image; transmitting the labeled keyframes to an AR Apps server; receiving limited promising keyframes on the basis of the labeled keyframes from the AR Apps server; and performing image feature matching between the promising keyframes and the input image, wherein the first information includes weighted grid information, and the weighted grid is applied to perform the image feature matching.

According to an embodiment of the present invention, a terminal performing image feature matching in a SLAM-based camera may be provided. The terminal includes a transceiver; and a processor controlling the transceiver, wherein the processor generates labeled keyframes including GPS information and first information from an input image; transmits the labeled keyframes to an AR Apps server; receives limited promising keyframes on the basis of the labeled keyframes from the AR Apps server; and performs image feature matching between the promising keyframes and the input image, in which the first information includes weighted grid information, and the weighted grid is applied to perform the image feature matching.

In addition, according to an embodiment of the present invention, the first information included in the labeled keyframes may include a feature descriptor, and the first information may further include at least one of user tag (UTag) information and object tag (OTag) information.

According to an embodiment of the present invention, the AR app server may generate the promising keyframes through keyframe filtering, and the promising keyframes may be generated on the basis of any one of the GPS information, the user tag (UTag) included in the first information, and the object tag (OTag) information included in the first information.

According to an embodiment of the present invention, the method may further include calculating a difference between latitude and longitude of GPS information received by a terminal and latitude and longitude of the GPS information of the labeled keyframes; and selecting only labeled keyframes for which the calculated difference is less than a threshold value and using the selected labeled keyframes for the image feature matching.

According to an embodiment of the present invention, the generating of the labeled keyframes may include identifying the GPS information by exchanging information with a peripheral server and database; and adding the identified GPS information to the labeled keyframes.

According to an embodiment of the present invention, a size of a grid cell to which the weighted grid may be applied depends on a size of image resolution.

According to an embodiment of the present invention, when applying the weighted grid to a first object, the first object may be selected by combining movement information of objects in the image and change information of the objects.

According to an embodiment of the present invention, a value of the weighted grid may be adjusted using an AR marker assigned to the input image.

According to an embodiment of the present invention, the method may further include applying the weighted grid to a correspondence relationship between keypoints in a camera input image and keypoints in the keyframes, thereby calculating a distance between corresponding points; and when the calculated distance is less than a threshold value, determining that the feature matching is performed and thus calculating a camera pose.

According to an embodiment of the present invention, one or more grid masks to which the weighted grid is applied may be used.

According to an embodiment of the present invention, the image feature matching is performed at high speed by using a soft grid mask.

In addition, according to an embodiment of the present invention, the method may further include, when the soft grid mask is applied, setting values for areas around the weighted grid to zero, wherein the image feature matching is performed by correcting weight values in the grid.

According to an embodiment of the present invention, one or more grid masks to which the weighted grid is applied may be used.

According to an embodiment of the present invention, a soft grid mask may be used to perform the image feature matching at high speed.

According to an embodiment of the present invention, an apparatus for performing image feature matching in a SLAM-based camera may be provided. The apparatus includes a terminal generating labeled keyframes including GPS information and first information from an input image; an AR Apps server in which AR map and keyframe information are stored; and a computing server inferring the GPS information and recognizing objects in the image using an algorithm; in which the first information includes weighted grid information, and the weighted grid is applied when performing the image feature matching.

In addition, according to an embodiment of the present invention, the AR Apps server may generate promising keyframes through keyframe filtering, and the promising keyframes may be generated on the basis of any one of the GPS information, a user tag (UTag) information included in the first information, and an object tag (OTag) information included in the first information.

According to an embodiment of the present invention, the computing server may identify the GPS information by exchanging information with a peripheral server and database; and add the identified GPS information to the labeled keyframes.

According to the present invention, a method capable of lowering feature matching error in SLAM-based camera tracking can be provided.

According to the present invention, a method capable of enhancing the accuracy and stability of image feature matching in feature matching between key frames and camera image can be provided.

The present invention can provide a method capable of ensuring the execution speed of an application even under a temporary or intermittent computing load.

The effects obtainable from the present disclosure are not limited to the effects mentioned above, and other effects not mentioned can be clearly understood by those skilled in the art from the description below.

BRIEF DESCRIPTION OF THE DRAWINGS

The above and other objects, features and other advantages of the present invention will be more clearly understood from the following detailed description when taken in conjunction with the accompanying drawings, in which:

FIG. 3 shows an additional information field format of labeled keyframes;

FIG. 9 is a diagram illustrating a method of performing feature matching between labeled keyframes and image using weighted grid information;

FIG. 10 is a diagram illustrating a grid mask whose weights are adjusted using an AR marker;

FIG. 12 is a diagram illustrating a soft grid mask; and

FIG. 13 is a diagram illustrating a method of applying a soft grid mask.

DETAILED DESCRIPTION OF THE INVENTION

Figure 1:
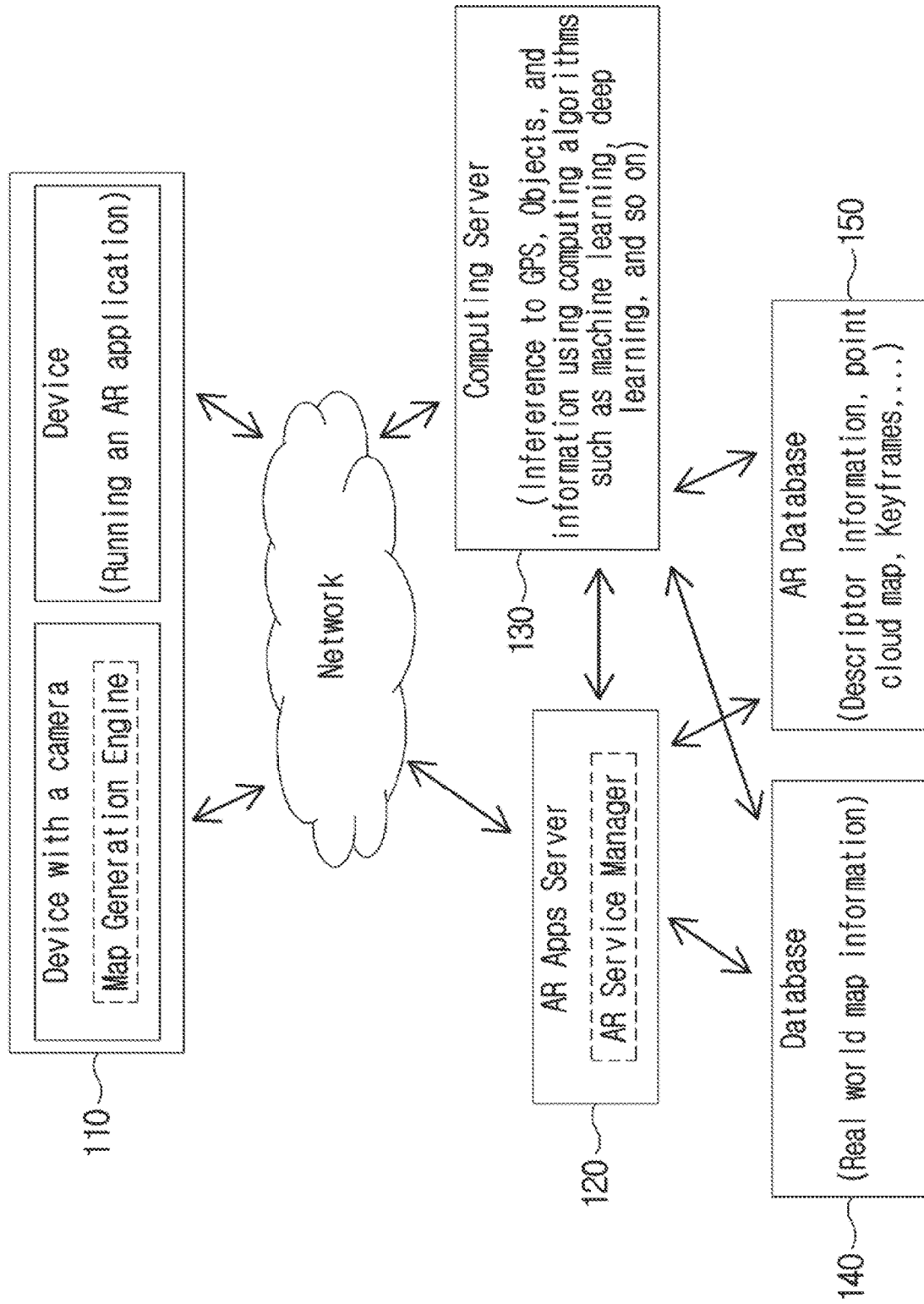
FIG. 1 is a diagram illustrating a network structure for an AR service.

In the following description of the embodiments of the present invention, a detailed description of known functions and configurations incorporated herein will be omitted when it may make the subject matter of the present disclosure unclear. Parts not related to the description of the present disclosure in the drawings are omitted, and similar parts are denoted by similar reference numerals.

In the present disclosure, the terms first, second, and so on are used only for the purpose of distinguishing one element from another, and do not limit the order or importance of the elements unless specifically mentioned. Thus, within the scope of this disclosure, the first component in an embodiment may be referred to as a second component in another embodiment, and similarly a second component in an embodiment may be referred to as a second component in another embodiment.

In the present disclosure, the components described in the various embodiments do not necessarily mean essential components, but some may be optional components. Accordingly, embodiments consisting of a subset of the components described in an embodiment are also included within the scope of this disclosure. Also, embodiments that include other components in addition to the components described in the various embodiments are also included in the scope of the present disclosure.

When a large number of keyframes depicting large-scale or multiple spaces are stored on a user terminal or one or more servers (or cloud servers), according to the present invention, a method in which in order to reduce image feature matching error and search time delay for keyframe selection, which are caused due to similar multiple keyframes, labeled keyframes including GPS information, an object tag, and a user tag, and the like are generated, and a limited number of promising keyframes are used, thereby increasing the feature matching performance; a method in which the image features are compared for unchanging objects, rather than temporary features due to environment change or dynamic object, by applying a weight value to the grid image area in feature matching between keyframes or labeled keyframes and camera image, thereby increasing the stability of matching; and a method of performing image feature matching based on grid mask, which is capable of discriminating a target to be compared when comparing image features, in order to ensure stable application execution speed (e.g., FPS) even under temporary load due to image processing by 3D graphics, etc.

Hereinafter, preferred embodiments of the present invention will be described in detail with reference to the drawings.

FIG. 1 is a diagram illustrating a network structure for an AR service.

Referring to FIG. 1, a SLAM-based camera image feature matching system for network utilization for an AR service includes a terminal 110, an AR Apps server 120, a computing server 130, and the like, and database 140 and AR database 150 may be required.

Herein, the terminal 110 may be a device with a camera, a device capable of executing an AR application, and the like. The terminal 110 may generate an AR map and keyframes from a map generation engine. The terminal 110 includes a transceiver unit and a processor controlling the transceiver unit.

The processor may generate labeled keyframes including GPS information and/or first information from the input image and transmit the labeled keyframes to the AR Apps server. The processor also serves to receive a limited number of promising keyframes on the basis of the labeled keyframes from the AR Apps server, perform feature matching between the promising keyframes and the input image, and so on.

In addition to the GPS, the first information may include at least one or more information of the input image, information related to the image processing, information related to keyframe filtering, and the like. For example, the first information may include keyframe resolution, feature descriptor, user tag information (service information, etc.), object tag information, and the like. However, the first information is not limited to the above-described information, and information related to image processing and keyframe filtering may be included.

In developing and executing an AR application, in order to arrange a 3D virtual object in real time at a proper position in the real space, a camera pose, that is, information about the position and direction of the camera is required. The SLAM-based camera tracking technology may calculate the camera pose by recognizing the space.

The AR map generation engine may be installed on the terminal 110 equipped with the camera in order to recognize the SLAM-based space, whereby a spatial map may be constructed with features obtained from the camera image. According to SLAM-based camera tracking methods that are known in the related art, keypoints in the image are used. A 3D point cloud map is constructed from the camera image for the real space, and keyframes of targets to be compared with the current camera image are generated at the time of camera tracking simultaneous with the construction of the AR map.

Figure 2:
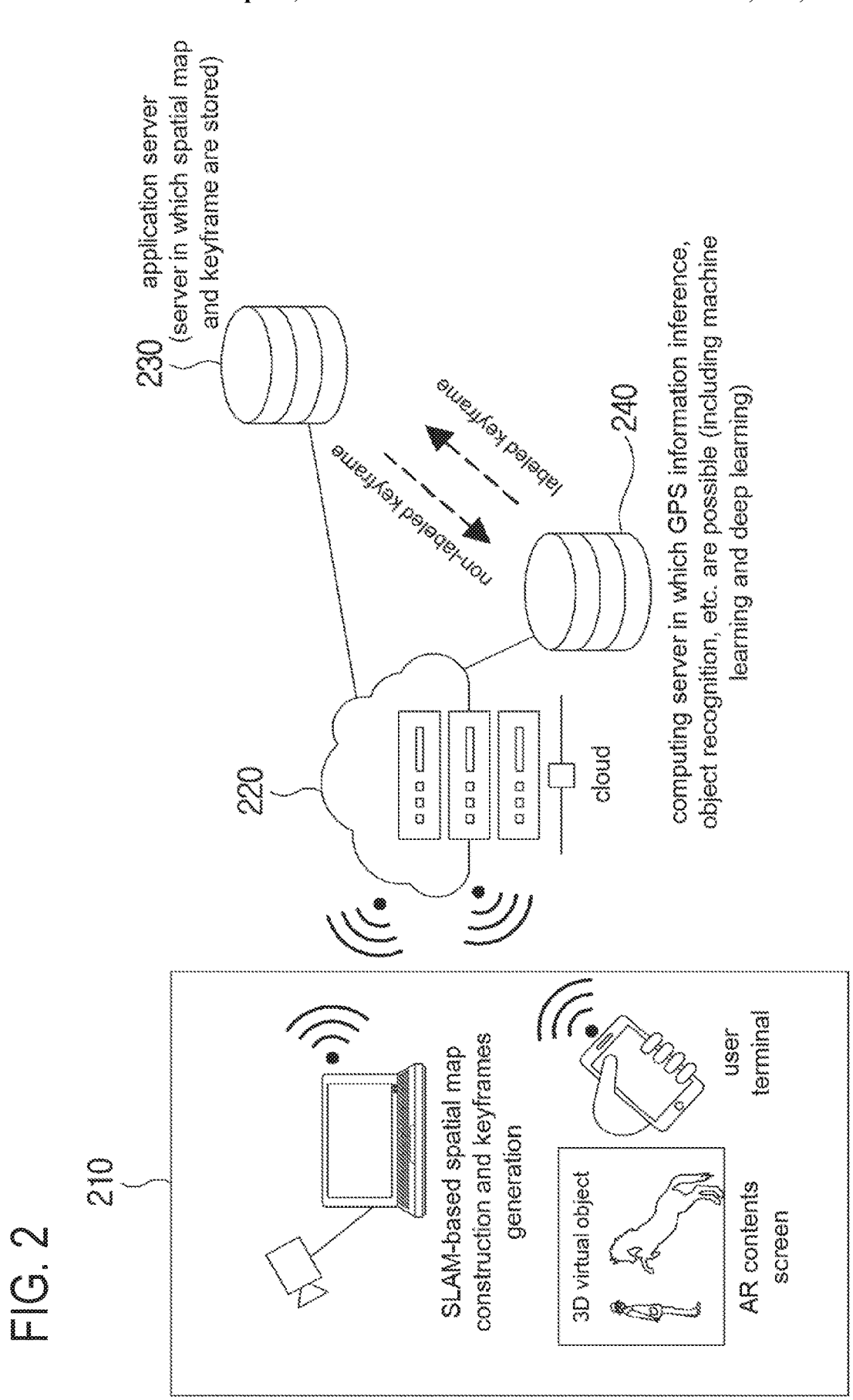
FIG. 2 is a diagram illustrating a network structure for an AR service using labeled keyframes.

FIG. 2 is a diagram illustrating a network structure for an AR service using labeled keyframes.

Herein, the labeled keyframe may refer to a case where additional information is added to the keyframe format. The present invention discloses a method of adding the additional information to the keyframe format and using the same, in which such keyframe may be referred to as a labeled keyframe. A frame having the same meaning may be applied the same as the labeled keyframe, and is not limited to the above-mentioned name. However, in the following, it is referred to as a labeled keyframe for convenience of explanation.

Herein, the additional information stored in the labeled keyframe may include GPS information and/or first information.

The GPS information is generated during constructing the spatial map and added to a keyframe labeled with a primary label.

During generating the labeled keyframes, when the device 210 is receiving the GPS information, it is possible to add information to the labeled keyframes. Otherwise, the corresponding field may be void.

Herein, a developer, a service provider, etc., may add a separate tag to the labeled keyframe. The added tag may be classified according to a purpose, such as a service name and may be classified according to object information in the image.

The constructed AR map and the labeled keyframes may be transmitted to an AR Apps server 230 or a cloud server 220 via the network. The AR Apps server 230 according to the present invention is the same as the application server 230 or may be included in the cloud server 220. The AR Apps server 230 typically has high performance computing resources. In the case of keyframes stored in the server, the object classification tag may be automatically included in the keyframe by using an object recognition algorithm in the image.

Keyframes in which the GPS information is not included in the AR Apps server 230 may be transmitted to the computing server 240. The computing server 240 may infer the GPS information and recognize objects in the image using algorithms such as image processing and deep learning that are currently available. During this process, it is possible to automatically or manually update and exchange information with peripheral servers or databases. Alternatively, the GPS information used during performing the camera tracking at the AR application user terminal 210 may be added to the labeled keyframes. When the server is automatically labeled, the additional search time required for keyframe selection and labeling may be reduced.

In particular, recently, since the similarity between images may be analyzed and inferred using machine learning and deep learning technology in a multimedia server, the GPS information may be automatically generated from the server 240 or the cloud server 220.

In addition, keyframes at a specific space may be preferentially used with tags added by service providers, developers, etc. (for example, tags different depending on a floor, a room, and the like in a building) for the first information, and keyframes having the common objects may be preferentially used with tags for objects in the image.

When the GPS information is added to the labeled keyframes, the AR application is executed in the user terminal 210 and location information of the user may be transmitted to the application server 230 when the camera tracking is attempted.

When the GPS information of the user terminal is transmitted to the AR Apps server 230, promising keyframes are limited among similar keyframes using the GPS information and transmitted to the user terminal 210 together with the spatial map or processed in the server 230.

When the GPS information is received at the user terminal 210 but is not transmitted to the AR Apps server 230, the process of tracking the camera using the spatial map and the labeled keyframes is performed at the user terminal 210.

When there is no GPS information at the user terminal 210, the promising keyframes may be limited using other tag information in the labeled keyframes. This will be explained later.

FIG. 3 shows an additional information field format of a labeled keyframe.

As shown in FIG. 3, it is possible to generate a labeled keyframe including GPS information and/or first information.

KFL-ID may correspond to an identification number of the labeled keyframe.

Res is the resolution of the keyframe, and a low resolution keyframe may be generated using a high resolution keyframe.

Des is a feature descriptor that is used to extract features in the image, such as keypoints, feature lines, and the like. The feature descriptor information should be considered for the purpose of keyframe selection, because even the same images are identified as features different from each other according to the feature descriptor. When the feature descriptor used in the camera image of the user terminal does not match the feature descriptor of the keyframe, the AR Apps server may transmit keyframes including keypoints and spatial map constructed with feature descriptor matching to the user terminal.

WGrid-N may indicate whether or not a weighted grid is used to perform image feature matching for key areas in the labeled keyframes. When expressed as 4 bits, 0000 may indicate that no weighted grid is used, and 0001 through 1110 may indicate the number of grid layers used in the weighted grid.

Grid-XY may correspond to row and column information (e. g., 4×4, 8×6, etc.) of the grid. When the grid to be used at the user terminal does not match the keyframe grid, it is possible to perform conversion using a separate conversion algorithm. For example, it is stable to be expanded and converted into areas including all the grid areas selected in the keyframe.

Grid-ID may correspond to an identification number of the grid.

Grid-V may indicate a weight in the grid. For example, in the case of a 4×4 grid, vector 1111 1122 1122 1111 may indicate that a weight is relatively applied by one to 2×2 area of the right-side middle portion.

GPS may include GPS latitude and longitude information in pairs.

Rank may be used to represent keyframes that are frequently referenced from user terminals and expressed in a form, such as 0~9 or 00~99. In order to use the keyframe at a general location where users start tracking the camera, the keyframe may be ordered according to the values.

bOD may be expressed as 01 in a case of indoor and 10 in a case of outdoor by using 2 bits. 00 is used to indicate no value, and 11 is used for a separate purpose.

UTag_Byte and UTag_Len may correspond to the number of labels added by the user and the byte length. The labeled keyframes may be tagged with a lot of tag information, and thus an indicator indicating the total length is required.

UTag1 through UTagM may correspond to labels by tags added by the user.

OTag_Byte and OTag_Len may correspond to the number of objects recognized from the image and the byte length in which the objects are labeled.

OTag1 through OTagM are labels by tags added by the object recognition algorithm.

OTag1_t, . . . , and OTagM_t are expiration time limits of object tags of OTag1 through OTagM. When this time is exceeded, the corresponding object tag is invalid and may be deleted in the process.

KFL-TM may correspond to an indicator indicating an end.

Figure 4:
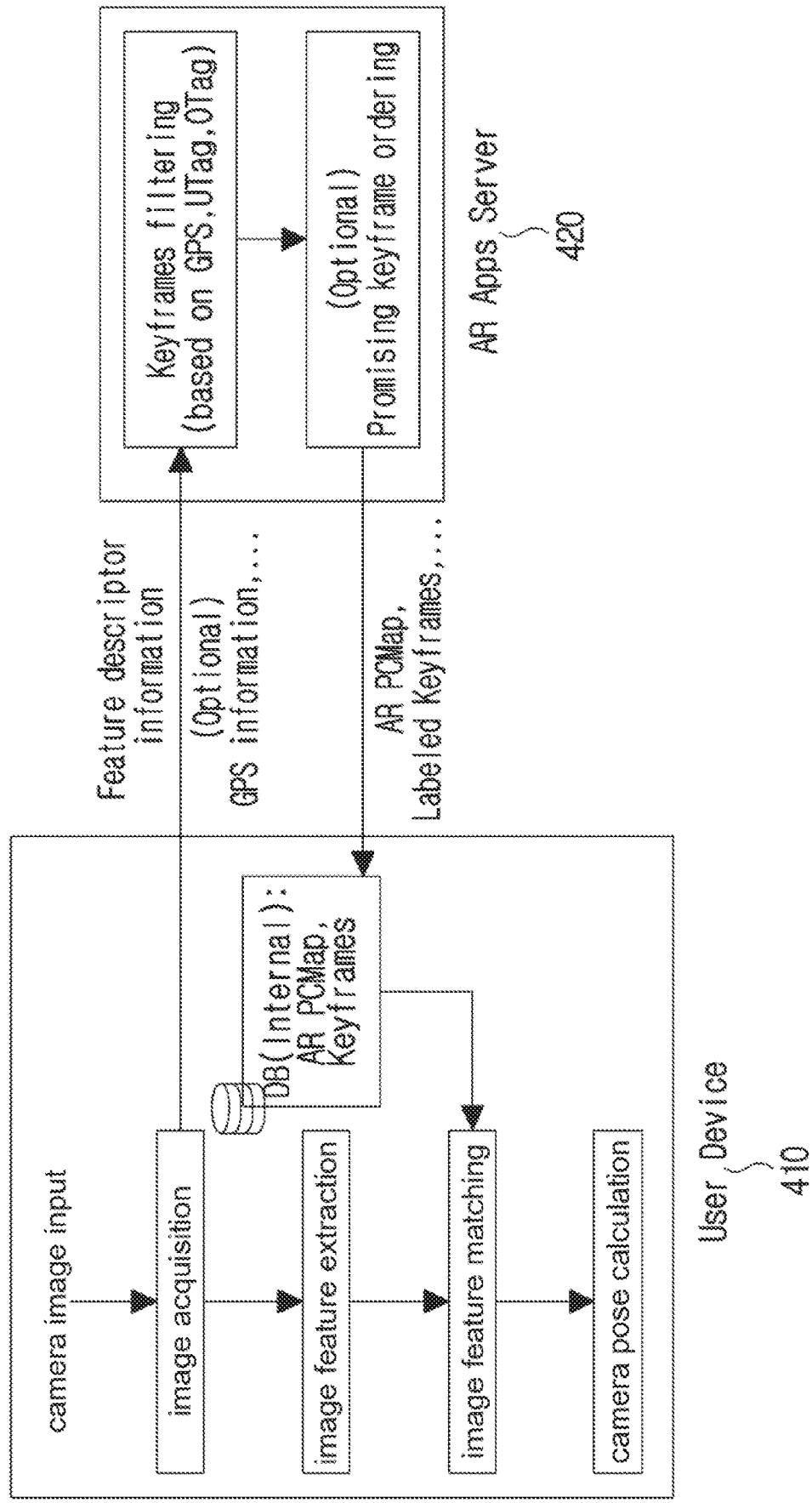
FIG. 4 is a diagram illustrating a process of calculating a camera pose using labeled keyframes.

FIG. 4 is a diagram illustrating a process of calculating a camera pose using labeled keyframes.

The AR Apps server (or cloud server) 420 may be used as necessary.

That is, when there is data necessary for the user terminal 410, the camera pose may be calculated through image feature matching by using the data. When information such as feature descriptor, GPS information, and representative image is transmitted from the user terminal 410 to the AR Apps server, the AR Apps server 420 may transmit promising keyframes to the user terminal 410 using the information.

As mentioned earlier, it is possible to fundamentally use the GPS information of the labeled keyframes. When there is GPS information of the user terminal 410 or the GPS information on the camera image, by comparing latitude $GPS_{u,x}$ and longitude $GPS_{u,y}$ at the user terminal 410 with latitude $GPS_{kf,x}$ and longitude $GPS_{kf,y}$ of labeled keyframes with GPS information, only labeled keyframes for which the spaced distance therebetween is lower than $D_{GPS}$ are selected and used. Herein, the condition may be expressed as Equation 1, and the keyframes may be compared with images capable of being obtained by the user terminal 410.

$$(GPS_{u,x}-GPS_{kf,x})^2+(GPS_{u,y}-GPS_{kf,y})^2<D_{GPS}^2 \quad \text{[Equation 1]}$$

The UTag used for keyframe filtering in the AR Apps server 420 is a tag added by a service provider, a developer, or the like, and may be set according to the purpose of a service or the like. For example, it is possible to use a tag of a combination of character strings used for identification of keyframes used in OOO AR App, keyframes used in the fifth floor of a building, and the like, arbitrary characters and numerals, or the like.

The OTag may be added by recognizing objects included in the image and be manually classified by a service provider, a developer, and the like. In addition, the OTag may be automatically recognized and added by executing object recognition algorithm in a computing server capable of performing machine learning or deep learning.

The AR Apps server 420 or the computing server has an advantage in system operation because it has high performance resources as well as utilizes idle time to manage resources (keyframes, etc.) capable of being used by a number of users. However, the object tag is valid only until OTag_t, which is the expiration time stamp.

Figure 5:
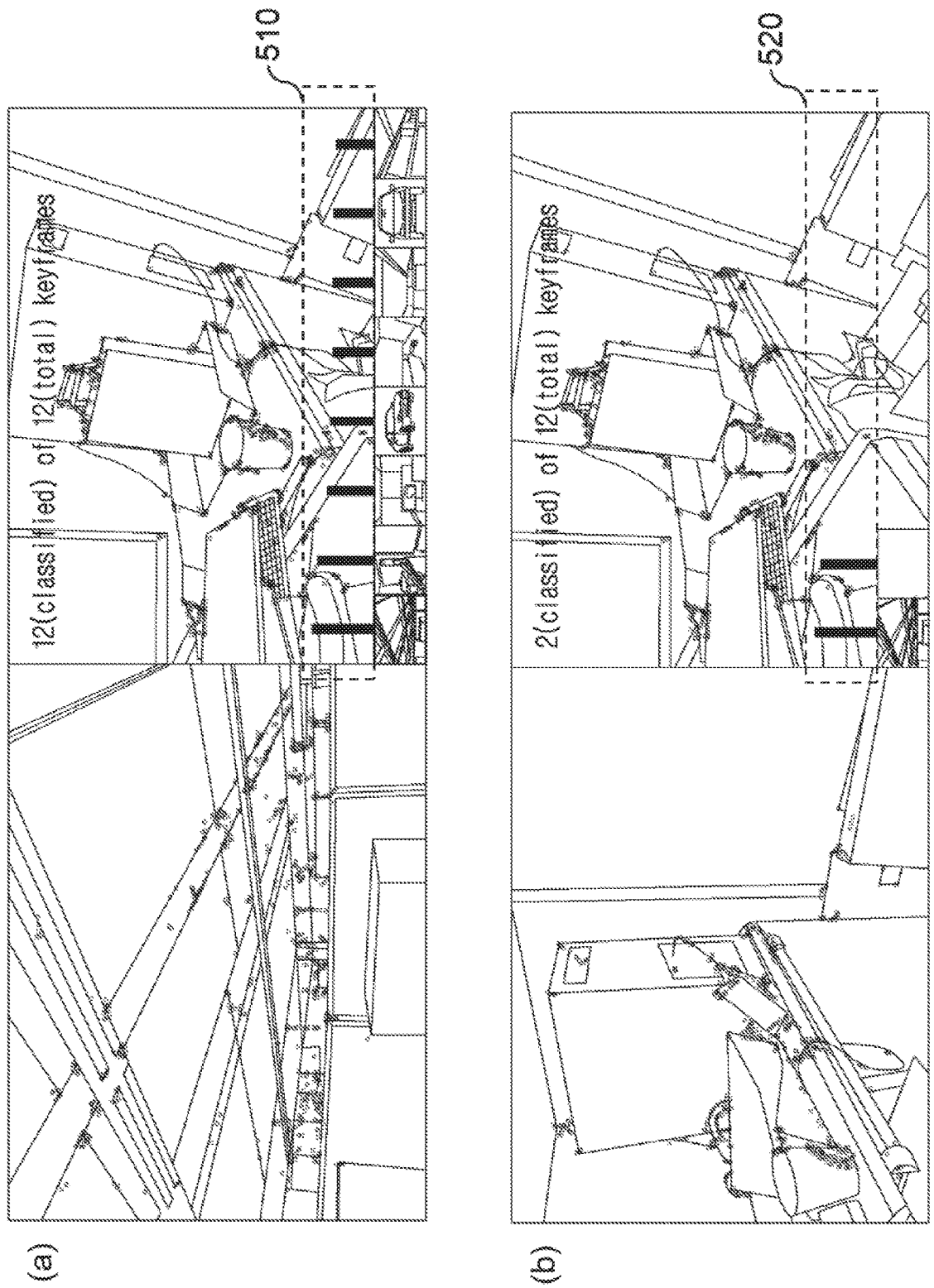
FIG. 5 is a diagram showing a test result of image feature matching after filtering keyframe by an OTag.

FIG. 5 is a diagram showing a test result of image feature matching after filtering keyframe by an OTag.

The corresponding experiment was performed on 50 keyframes obtained from various places. In this experiment, ORB feature descriptor was used for extraction and matching of keypoints.

In FIG. 5, an upper view (a) corresponds to a result of selecting keyframes through image feature matching for all keyframes. Meanwhile, a lower view (b) corresponds to a result of selecting keyframes through image feature matching among keyframes labeled with an OTag termed 'cup'.

The images on the left in the upper view (a) and the lower view (b) of FIG. 5 are keyframes selected as a result of the most matching keypoints for the camera input image of the user terminal on the right.

When the keyframe selection is performed at the user terminal, it is possible to search keyframes stored in the user terminal, including keyframes downloaded via communication with the server. When the keyframe selection is performed at the server, the representative image of the user terminal may be transmitted to the server and the keyframes may be selected through the search of the keyframe at the server. Then, the keyframes are transmitted to the user terminal, and selected by performing image feature matching with the current camera image of the user terminal. At the bottom of the right image in the upper view (a), the keyframes in a group of reference targets are arranged in order of decreasing matching through keypoint matching. The matching levels are shown as forms of black bars (510,520) according to the number of keypoints.

As shown in the upper view (a) of FIG. 5, there are a number of similar keyframes, including keyframes in outdoor environments with cars. Since there are many similar keyframes, it may be confirmed that the keyframes for calculating the camera pose are not appropriate. The distribution of keypoints is determined by objects on the camera image, in which a matching error may occur depending on the distribution of the keypoints. Increasing the camera resolution allows for extraction and comparison of more sophisticated keypoints, but computational complexity increases and thus high computing resources are required. Due to the high computational complexity, AR game application requires much more effort to run at resolution or higher of 800×600, despite of 4K-class monitor technology. In FIG. 5, compared to the upper view (a), the lower view (b) has higher accuracy because some of keyframes labeled by the OTag termed 'cup' are filtered, and thus the keyframes are selected from among a small number of keyframes through keypoint matching, thereby improving the accuracy.

Figure 6:
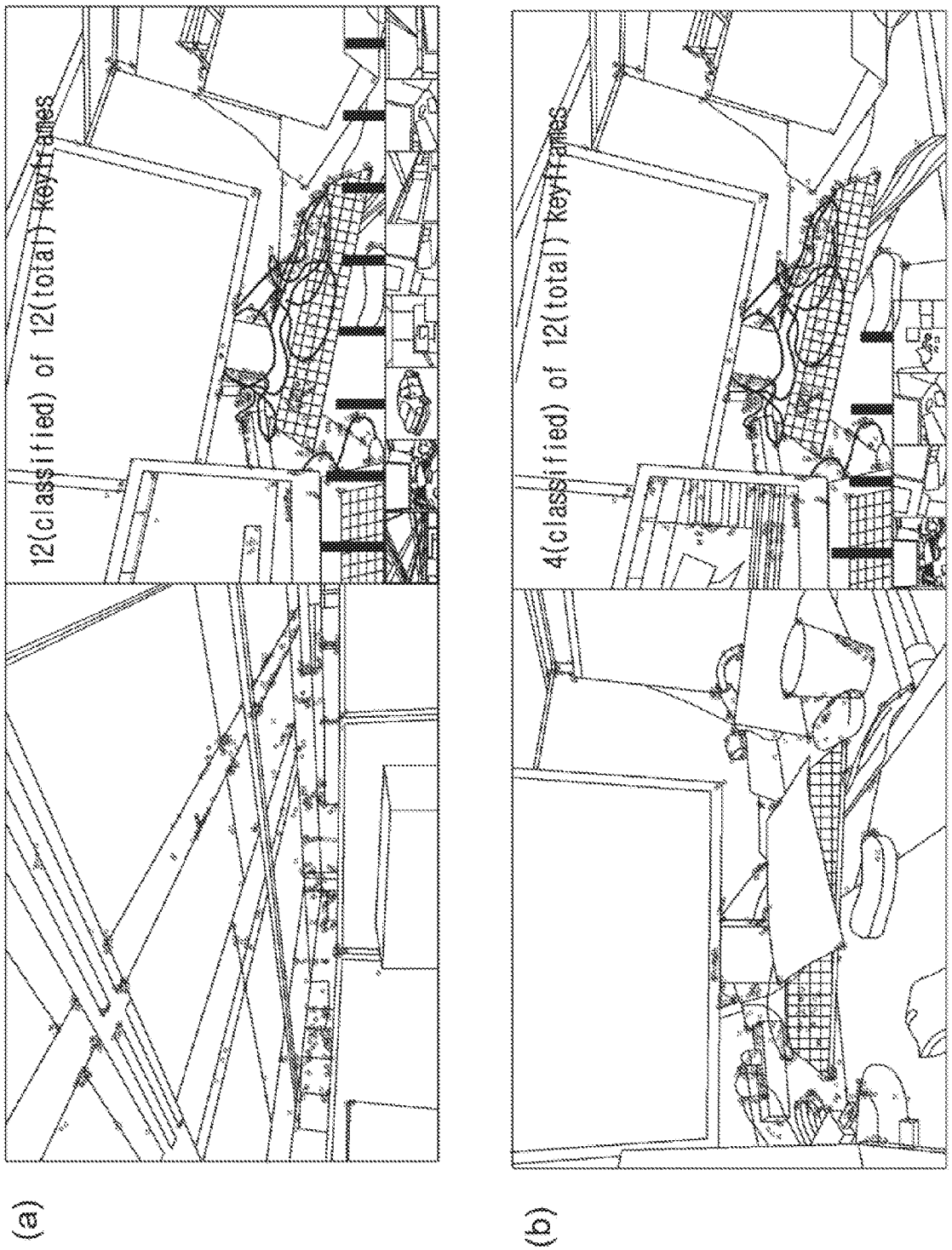
FIG. 6 is a diagram showing a test result of image feature matching after filtering keyframes by an OTag.

FIG. 6 is a diagram showing a test result of image feature matching after filtering keyframe by an OTag.

In FIG. 6, an upper view (a) corresponds to a result obtained after selecting keyframes from among all the keyframes. A lower view (b) corresponds to a result of image feature matching after selecting keyframes among keyframes labeled with an OTag pointing to a 'monitor'.

Herein, many keyframes are not distributed in the monitor, so it is very difficult to select the keyframes. Herein, when the keyframes labeled without an OTag for the monitor are removed, it may be seen to be advantageous in finding an appropriate keyframe in selecting keyframes through feature matching. That is, even when the image is hard to identify because the keypoints are distributed in a specific area, the tags for the objects in the image may be useful.

Figure 7:
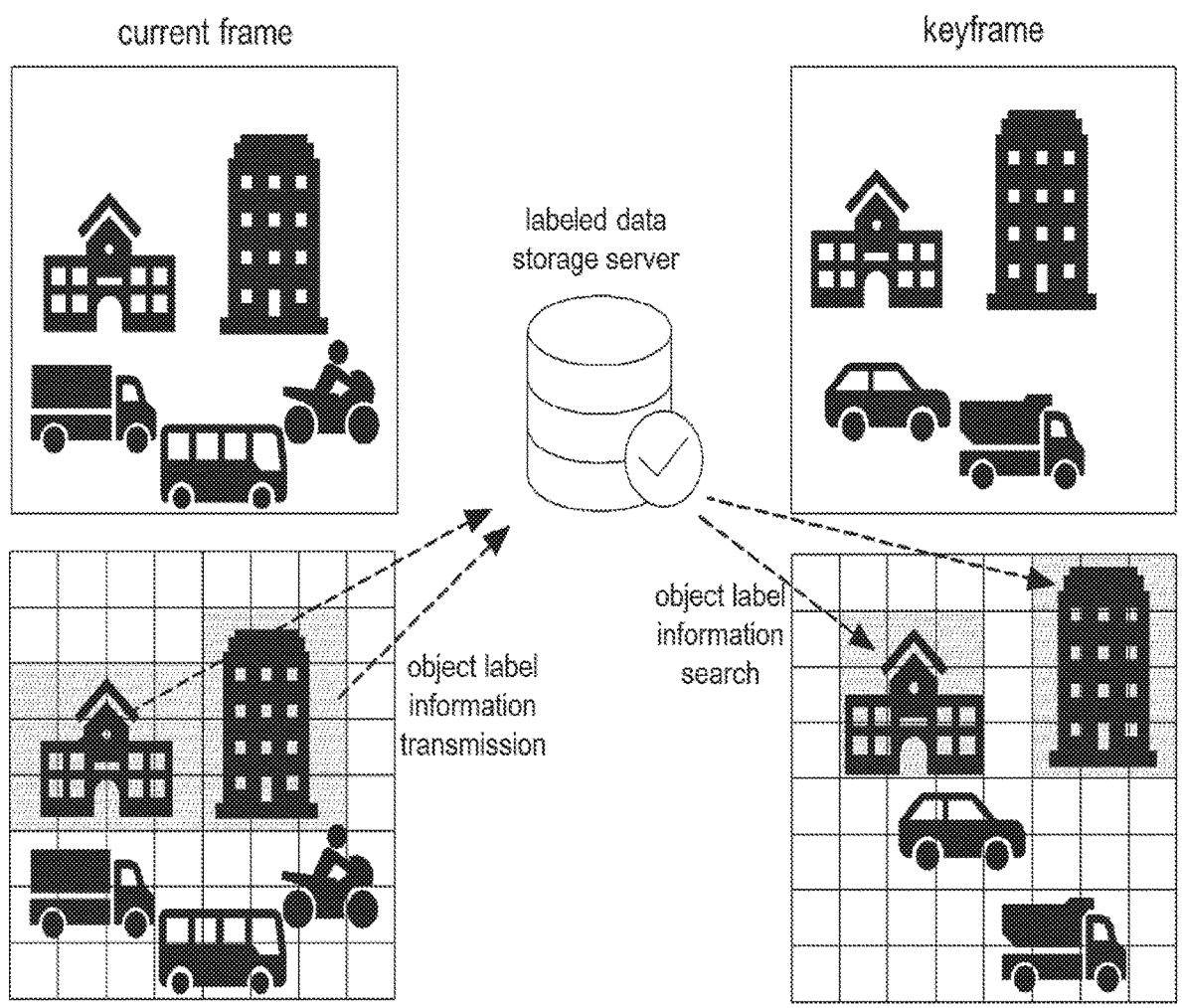
FIG. 7 is a diagram illustrating a method of performing image feature matching using a grid.

FIG. 7 is a diagram illustrating a method of performing image feature matching using a grid.

The keyframe image is divided into grid areas in the keyframe according to GridXY information (e.g., 4×4, 6×6, 8×10, etc.) included in the first information. In FIG. 7, an 8×8 grid is used. The size of a grid cell may vary depending on the size of the image resolution.

Figure 8:
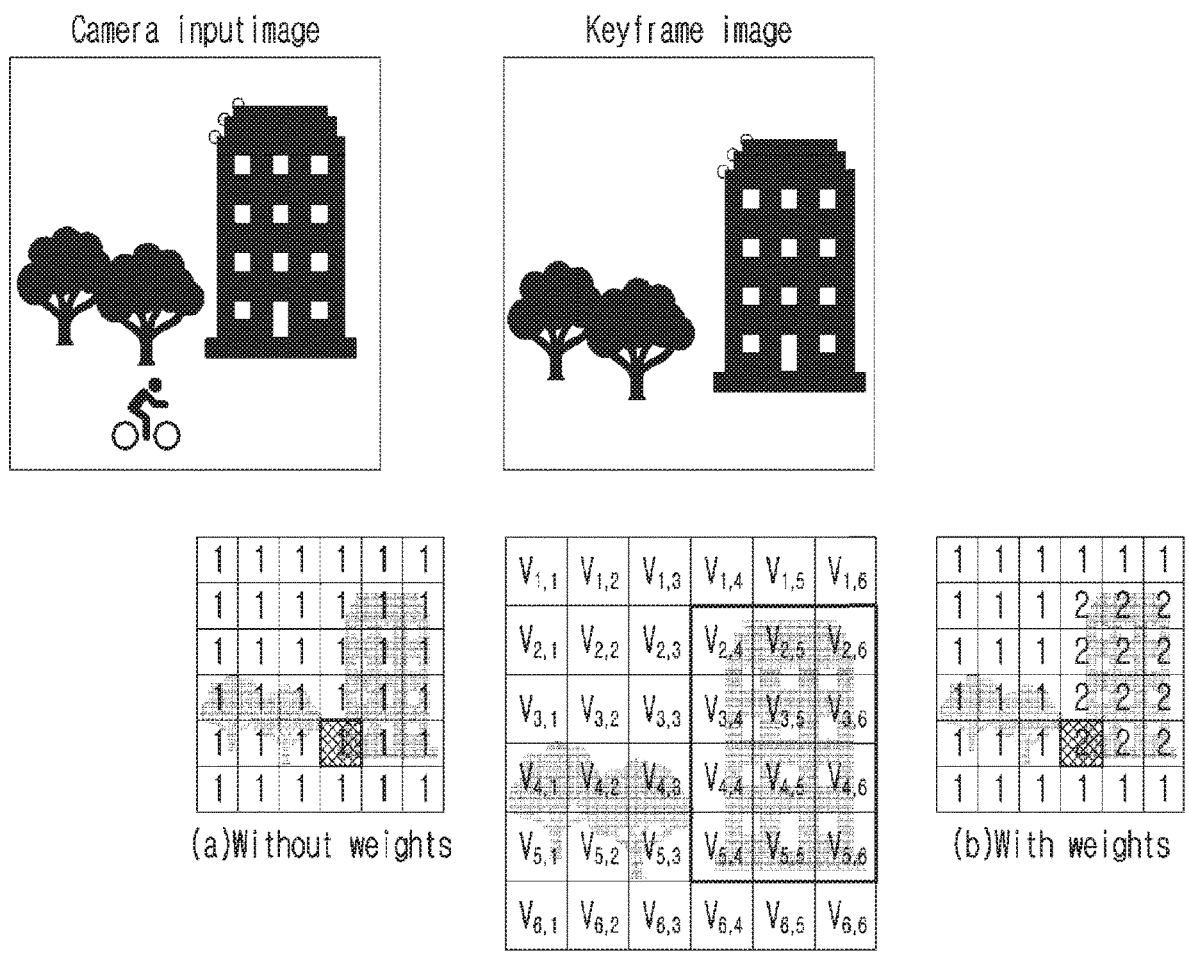
FIG. 8 is a diagram illustrating a method of performing feature matching between labeled keyframes and image using weighted grid information.

FIGS. 8 and 9 are diagrams illustrating a method of performing feature matching between the labeled keyframe and the image using weighted grid information Using the weighted grid information included in the labeled keyframe, it is possible to select the keyframe as the accuracy of keyframe selection is increased or the AR Apps execution time is ensured.

The reason why a grid is used for weighted features (e.g., keypoint, feature line, feature object, etc.) is because the grid may be easily expressed in a simple bitmap format for a variety of resolutions, the distribution of features is easy to be known (e.g., feature comparison is difficult when keypoints are gathered in one place), and similar patterns are processed in parallel.

When the feature matching is partially performed by applying a weight to the image area using the grid in feature matching (keypoint, feature line, feature object, etc.) between keyframes or labeled keyframes and the camera input image, a weighted grid is applied to the first object.

The first object may be a grid area or object having characteristics that are considered to be an important factor in image feature matching. Herein, the first object may be selected by combining the movement information of the object in the image and the change information of the object. More specifically, the first object is to be matched on the basis of a feature that is important for the entire image or is not affected by environmental changes or temporal changes due to dynamic objects. This improves the accuracy and stability of matching. In FIG. 8, a weight is given to buildings that are difficult to change easily.

The weighted grid may be manually added by a service provider or a developer, and may be automatically assigned by a computer through comparison of a plurality of keyframes or recognition of an object.

In FIG. 8, although two is used as a weight relative to one, another number may be used. The importance of the keypoint (or feature line, feature object, etc.) detected in the grid area is represented according to the weight of the grid.

In the case of a lower-left view (a) in FIG. 8, each weight in each of grids is equal to one. In other words, it produces the same result as when the grids are not used. In this case, the correspondence between the keypoints in the camera input image and the keypoints in the keyframe is counted in a unit of one. When the distance between the corresponding points is smaller than a threshold value di as shown in FIG. 9, it is regarded as feature matching. In the case that the total number of keypoints in the image is N and the number of matched keypoints is Nm, when a ratio therebetween is greater than a predetermined value, that is, Nm/N>M, it is determined to be matched, thereby calculating the camera pose. In a case of M=0.8, when 850 keypoints out of a total of 1000 keypoints are matched, the camera pose for camera tracking is calculated as Nm/N=850/1000=0.85.

In the case of a lower-right view (b) in FIG. 8, each weight of a part of the grids is set to 2.

In grid areas with the weight of two, the correspondence between the keypoints in the camera input image and the keypoints in the keyframes is counted in a unit of two. Likewise, when the distance between the corresponding points is smaller than the threshold value di as shown in FIG. 9, it is regarded as feature matching, in which the weight is doubled only for the number of points. When the number of a total of keypoints is 1000 (N=1000), wherein there are 600 weighted areas of one and 400 weighted areas of two, the number of total keypoints in the weighted grid is N*=600+2×400=1400. Assuming that 420 keypoints are matched in the weighted areas of one and 360 keypoints are matched in the weighted areas of two, the number of matched keypoints in the weighted grids is N*m=440+2×380=1200. When M=0.8, the camera pose for camera tracking is calculated as N*m/N*=1200/1400=0.86 (Nm/N=780/1000=0.78<M=0.8). That is, when an object of an obstacle element is newly placed or a dynamic object is present in the camera image, and when a part of the camera image is temporarily blocked, the number of keypoints to be matched is significantly reduced, and thus camera tracking may fail. Although the number of keypoints is 780 in (b) of FIG. 8 and fewer than 800 in (a) of FIG. 8, the camera tracking is normally succeeded by the feature matching for the main object.

The value of the weighted areas may be a value other than two.

In some respects of the AR application, the feature matching may be performed for the target object to overlap 3D virtual objects. By doing this, the accuracy of keypoint matching may be improved by adding the weight to a fixed object rather than the image feature generated by the change of the natural environment, the moving object, and the like.

The method may also be extended to feature lines and feature objects in the grid area.

When applying the weighted grids, it is possible to repeatedly use weighted grids and non-weighted grids in a unit of a fixed time. The non-weighted grids are temporarily identified, thereby determining how much difference there is between the keyframes and the current camera image, and thus adjusting the weight value in the weighted grid.

FIG. 10 is a diagram illustrating a grid mask whose weights are adjusted using an AR marker.

In SLAM-based camera tracking, when an AR marker is assigned to a camera input image, the AR marker may be weighted automatically and recognized. It is possible to use an image texture or the like as the AR marker. The AR marker may be stored in a user terminal or server. The grid area for the AR marker may be manually specified by the user. Recognition may be stable when the weight value is added to a stationary and flat AR marker.

Figure 11:
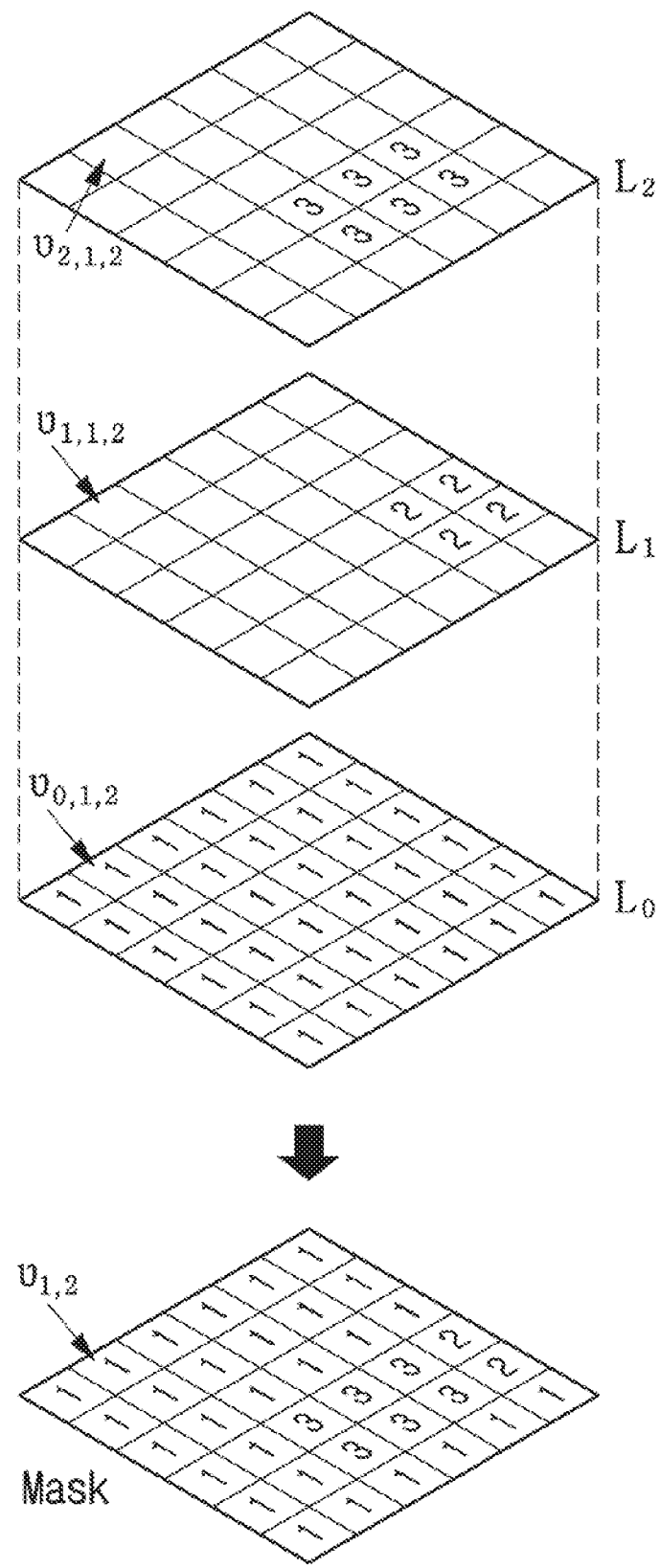
FIG. 11 is a diagram illustrating a grid mask to which multiple layers are applied.

FIG. 11 is a diagram illustrating a grid mask applied with multiple layers.

The grid mask may be calculated in multiple layers. The L0 layer may correspond to a default weight. Herein, L1, . . . , and Lt may correspond to grid layers to which weights are applied for objects that are designated by the user or automatically designated. As in Equation 2, the maximum value of grid position value $\upsilon_{x,y}$ for layer Li other than L0 is calculated, thereby determining grid mask value $\upsilon_{x,y}$ to be finally applied.

$$\upsilon_{x,y} = \max(\upsilon_{0,x,y}, \upsilon_{1,x,y}, \ldots \upsilon_{h,x,y}) \quad \text{[Equation 2]}$$

For example, in FIG. 10 with two layers (h=2), a value of one grid area $\upsilon_{4,3}$ of the grid mask may correspond to $\upsilon_{4,5} = \max(\upsilon_{0,4,3}, \upsilon_{1,4,3}, \upsilon_{2,4,3}) = \max(1, 0, 3) = 3$.

A value of another grid area $\upsilon_{4,3}$ may be determined as $\upsilon_{4,5} = \max(\upsilon_{0,4,5}, \upsilon_{1,4,5}, \upsilon_{2,4,5}) = \max(1, 2, 3) = 3$.

Each weight of each grid layer may be set for objects detected by the user or automatically. Using this approach, the weighted grid may be automatically stored through communication with the server.

FIG. 12 is a diagram illustrating a soft grid mask.

The grid scheme may also be used to guarantee the AR application execution speed. When a performance of at least 20 FPS has to be guaranteed in an application such as a game, a large number of features (keypoint, feature line, etc.) in the camera image requires a large amount of calculation, which may not guarantee the performance of 20 FPS.

In this case, it is possible to guarantee stable application execution speed (e.g., FPS) when performing image feature matching for keyframe or labeled keyframes and some areas in the camera image. In order to express the comparison area, the grid mask information which may be expressed in forms of bits may be stored and used together with the keyframes.

Herein, the selection criterion of some areas is such that feature matching is performed only for the areas having a higher weight value from the grid areas and processing of features with low importance is delayed, whereby quick calculation may be possible.

In this case, a soft grid mask may refer to a modified grid mask that performs calculations only on partial grids. Differently from the grid mask to which the weighted grid is applied as described above, the grid mask may be partially used to enable high speed image feature matching by determining the grid to which the weighted grid is applied, which is referred to as a soft grid mask. In one embodiment, the soft grid mask may be implemented as a form that calculates a certain range around weighted grid areas, a form that calculates only weighted grid areas, or a form that calculates only grid areas with high weights.

In FIG. 12, the view (a) represents a soft grid mask calculating for a predetermined range around weighted grid areas; (b) represents a soft grid mask calculating for only the weighted grid areas; and (c) represents a soft grid mask calculating for only grid areas with higher weights.

FIG. 13 is a diagram illustrating a method of applying a soft grid mask.

To apply a soft grid mask, a value for areas around the weight value is set to zero. Thereafter, Equation 3 and Equation 4 are calculated in order to compensate the weight value in the grid.

$$\Delta\upsilon = \operatorname{argmin}_{\upsilon_{x,y}}(\upsilon_{1,x,y}, \ldots, \upsilon_{h,x,y}) - 1 \quad \text{[Equation 3]}$$

$$\upsilon'_{x,y} = \max(\upsilon_{x,y} - \Delta\upsilon, 0) \quad \text{(Equation 4]}$$

Through the above equation, new weight $\upsilon'_{x,y}$ of the soft grid mask is calculated. Using the soft grid mask, feature matching is performed between the labeled keyframes and the camera input image to select the keyframes, and the camera pose is calculated using the keyframes.

In FIG. 13, the view (a) shows correction of weight values of the soft grid mask calculated for a predetermined range around weighted grid areas; (b) shows correction of a weight value of the soft grid mask calculated only for the weighted grid areas; and (C) shows correction of weight values of the soft grid mask calculated for only grid areas having high weight value. In particular, since the relative weight values are removed out in the views (b) and (c) in FIG. 13, it is possible to use the soft grid mask removed by the value.

The invention claimed is:

1. A method of performing image feature matching in a Simultaneous Localization and Mapping (SLAM)-based camera, the method comprising:
processing computer executable program code embodied in non-transitory computer readable storage media by one or more processors, the computer executable program code comprising instructions for:
generating labeled keyframes including Global Positioning System (GPS) information and first information from an input image;
transmitting the labeled keyframes to an Augmented Reality (AR) Apps server;
receiving limited promising keyframes on the basis of the labeled keyframes from the AR Apps server; and
performing image feature matching between the promising keyframes and the input image.

2. The method of claim 1, wherein the first information included in the labeled keyframes includes a feature descriptor, and the first information further includes at least one of user tag (UTag) information and object tag (OTag) information.

3. The method of claim 1, wherein the AR app server generates the promising keyframes through keyframe filtering, and the promising keyframes are generated on the basis of any one of the GPS information, the user tag (UTag) included in the first information, and the object tag (OTag) information included in the first information.

4. The method of claim 1, further comprising:
calculating a difference between latitude and longitude of GPS information received by a terminal and latitude and longitude of the GPS information of the labeled keyframes; and
selecting only labeled keyframes for which the calculated difference is less than a threshold value and using the selected labeled keyframes for the image feature matching.

5. The method of claim 1, wherein the generating of the labeled keyframes includes:
identifying the GPS information by exchanging information with a peripheral server and database; and
adding the identified GPS information to the labeled keyframes.

6. The method of claim 1, wherein the first information includes weighted grid information, and the weighted grid is applied to perform the image feature matching.

7. The method of claim 6, wherein a size of a grid cell to which the weighted grid is applied depends on a size of image resolution.

8. The method of claim 6, wherein when applying the weighted grid to a first object, the first object is selected by combining movement information of objects in the image and change information of the objects.

9. The method of claim 6, wherein a value of the weighted grid is adjusted using an AR marker assigned to the input image.

10. The method of claim 6, further comprising instructions for:
applying the weighted grid to a correspondence relationship between keypoints in a camera input image and keypoints in the keyframes, thereby calculating a distance between corresponding points; and
when the calculated distance is less than a threshold value, determining that the feature matching is performed and thus calculating a camera pose.

11. The method of claim 6, wherein one or more grid masks to which the weighted grid is applied are used.

12. The method of claim 1, wherein the image feature matching is performed at high speed by using a soft grid mask.

13. The method of claim 12, further comprising: when the soft grid mask is applied,
wherein setting values for areas around the weighted grid to zero, and
wherein the image feature matching is performed by correcting weight values in the grid.

14. A terminal performing image feature matching in a Simultaneous Localization and Mapping (SLAM)-based camera, the terminal comprising:
a transceiver; and
a processor controlling the transceiver,
wherein the processor:
generates labeled keyframes including Global Positioning System (GPS) information and first information from an input image;
transmits the labeled keyframes to an Augmented Reality (AR) Apps server;
receives limited promising keyframes on the basis of the labeled keyframes from the AR Apps server; and
performs image feature matching between the promising keyframes and the input image.

15. The terminal of claim 14, wherein the first information includes weighted grid information, and the weighted grid is applied to perform the image feature matching.

16. The terminal of claim 15, wherein one or more grid masks to which the weighted grid is applied are used.

17. The terminal of claim 15, wherein a soft grid mask is used to perform the image feature matching at high speed.

18. An apparatus for performing image feature matching in a Simultaneous Localization and Mapping (SLAM)-based camera, the apparatus comprising:
a terminal generating labeled keyframes including GPS information and first information from an input image;
an AR Apps server in which Augmented Reality (AR) map and keyframe information are stored; and
a computing server inferring the Global Positioning System (GPS) information and recognizing objects in the image using an algorithm;
in which the first information includes weighted grid information, and the weighted grid is applied when performing the image feature matching.

19. The apparatus of claim 18,
wherein the AR Apps server generates promising keyframes through keyframe filtering, and
the promising keyframes are generated on the basis of any one of the GPS information, a user tag (UTag) information included in the first information, and an object tag (OTag) information included in the first information.

20. The apparatus of claim 18,
wherein the computing server identifies the GPS information by exchanging information with a peripheral server and database; and
adds the identified GPS information to the labeled keyframes.

* * * * *